(12) United States Patent
Fang et al.

(10) Patent No.: US 11,145,194 B2
(45) Date of Patent: Oct. 12, 2021

(54) SMART ROADSIDE UNIT AND METHOD FOR PROCESSING INFORMATION BY SMART ROADSIDE UNIT

(71) Applicant: BAIDU ONLINE NETWORK TECHNOLOGY (BEIJING) CO., LTD., Beijing (CN)

(72) Inventors: Lei Fang, Beijing (CN); Haisong Wang, Beijing (CN); Xing Hu, Beijing (CN); Sheng Tao, Beijing (CN); Yifeng Shi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 204 days.

(21) Appl. No.: 16/523,126

(22) Filed: Jul. 26, 2019

(65) Prior Publication Data
US 2020/0074850 A1    Mar. 5, 2020

(30) Foreign Application Priority Data

Aug. 31, 2018    (CN) .......................... 201811012975.0

(51) Int. Cl.
*G08G 1/01*    (2006.01)
*G08G 1/04*    (2006.01)
(Continued)

(52) U.S. Cl.
CPC ........... *G08G 1/0116* (2013.01); *G08G 1/017* (2013.01); *G08G 1/04* (2013.01); *G08G 1/07* (2013.01)

(58) Field of Classification Search
CPC .... G08G 1/0116; G08G 1/017; G08G 1/0175; G08G 1/04; G08G 1/07; H04N 5/2355
See application file for complete search history.

(56) References Cited

U.S. PATENT DOCUMENTS

2008/0175438 A1*    7/2008  Alves ................... G08G 1/0175
                                                        382/105
2013/0151135 A1*    6/2013  Aubrey ................ G08G 1/0116
                                                        701/118
(Continued)

FOREIGN PATENT DOCUMENTS

CN    103595916 A    2/2014
CN    104144290 A    11/2014
(Continued)

OTHER PUBLICATIONS

Chinese Patent Application No. 201811012975.0, First Office Action dated Aug. 5, 2020, 11 pages.
(Continued)

*Primary Examiner* — Sisay Yacob
(74) *Attorney, Agent, or Firm* — Lathrop GPM LLP

(57) ABSTRACT

Provided is a smart roadside unit, including a light intensity sensor configured to generate current light intensity information; a high-bright camera assembly configured to capture a high-bright image; a low-bright camera assembly configured to capture a low-bright image; and a controller configured to turn on the high-bright camera assembly to shoot when the current light intensity is greater than a first light intensity threshold, turn on the low-bright camera assembly to shoot when the current light intensity is less than a second light intensity threshold, and extract vehicle information from the high-bright image or the low-bright image, in which the second light intensity threshold is smaller than the first light intensity threshold.

20 Claims, 2 Drawing Sheets

(51) Int. Cl.
*G08G 1/017* (2006.01)
*G08G 1/07* (2006.01)

(56) References Cited

U.S. PATENT DOCUMENTS

| | | | |
|---|---|---|---|
| 2018/0013955 A1 | 1/2018 | Kim et al. | |
| 2018/0048801 A1* | 2/2018 | Kiser | H04N 5/23238 |
| 2018/0121763 A1 | 5/2018 | Surnilla et al. | |
| 2019/0180132 A1* | 6/2019 | Grunzinger, Jr. | G06K 9/325 |

FOREIGN PATENT DOCUMENTS

| | | | |
|---|---|---|---|
| CN | 105632238 A | 6/2016 | |
| CN | 105799574 A | 7/2016 | |
| CN | 106506963 A | 3/2017 | |
| CN | 107945540 A | 4/2018 | |
| CN | 107948405 A | 4/2018 | |
| CN | 108010360 A | 5/2018 | |
| CN | 108109393 A | 6/2018 | |
| JP | 2001195688 A | 7/2001 | |
| JP | 2003141679 A | 5/2003 | |
| JP | 2008039642 A | 2/2008 | |
| JP | 2008052517 A | 3/2008 | |
| JP | 2008299785 A | 12/2008 | |
| KR | 101080722 B1 | 11/2011 | |
| RU | 2016120392 A | 11/2017 | |

OTHER PUBLICATIONS

Chinese Patent Application No. 201811012975.0, English translation of First Office Action dated Aug. 5, 2020, 12 pages.
Japanese Patent Application No. 2019155574, First Office Action dated Oct. 20, 2020, 3 pages.
Japanese Patent Application No. 2019155574, English translation of First Office Action dated Oct. 20, 2020, 3 pages.
Japanese Patent Application No. 2019-155574, Second Office Action dated May 11, 2021, 2 pages.
Japanese Patent Application No. 2019-155574, English translation of Second Office Action dated May 11, 2021, 3 pages.

* cited by examiner

SMART ROADSIDE UNIT AND METHOD FOR PROCESSING INFORMATION BY SMART ROADSIDE UNIT

CROSS-REFERENCE TO RELATED APPLICATION

This application claims priority to and benefits of Chinese Patent Application Serial No. 201811012975.0, filed with the State Intellectual Property Office of P. R. China on Aug. 31, 2018, the entire content of which is incorporated herein by reference.

FIELD

The present disclosure relates to the field of traffic technologies, and more particularly to a smart roadside unit and a method for processing information by a smart roadside unit.

BACKGROUND

A smart roadside unit may be used in an application such as autonomous driving. As requirements for intellectualization of the smart roadside unit increase, a sensing capability of the smart roadside unit should be improved. In order to improve an active sensing capability of the smart roadside unit, the smart roadside unit may be added with different sensing detectors. However, in some scenes, if only one camera is used, vehicle identification may not be accurate enough since a light sensitivity of such a camera is an inherent feature and thus is relatively fixed.

SUMMARY

In embodiments of an object of the present disclosure, a smart roadside unit is provided, including: a light intensity sensor configured to generate current light intensity information; a high-bright camera assembly configured to capture a high-bright image; a low-bright camera assembly configured to capture a low-bright image; and a controller configured to turn on the high-bright camera assembly to shoot when the current light intensity is greater than a first light intensity threshold, turn on the low-bright camera assembly to shoot when the current light intensity is less than a second light intensity threshold, and extract vehicle information from the high-bright image or the low-bright image, in which the second light intensity threshold is smaller than the first light intensity threshold.

In embodiments of another object of the present disclosure, a method for processing information by a smart roadside unit is provided, including: acquiring current light intensity information; turning on a high-bright camera assembly to shoot and capturing a high-bright image when the current light intensity is greater than a first light intensity threshold, or turning on a low-bright camera assembly to shoot and capturing a low-bright image when the current light intensity is less than a second light intensity threshold; and extracting vehicle information from the high-bright image or the low-bright image, in which the second light intensity threshold is smaller than the first light intensity threshold.

In embodiments of a further object of the present disclosure, a non-temporary computer-readable storage medium is provided, having stored therein computer programs that, when executed by a processor, cause the processor to perform a method for processing information by a smart roadside unit, in which the method includes: acquiring current light intensity information; turning on a high-bright camera assembly to shoot and capturing a high-bright image when the current light intensity is greater than a first light intensity threshold, or turning on a low-bright camera assembly to shoot and capturing a low-bright image when the current light intensity is less than a second light intensity threshold; and extracting vehicle information from the high-bright image or the low-bright image, in which the second light intensity threshold is smaller than the first light intensity threshold.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
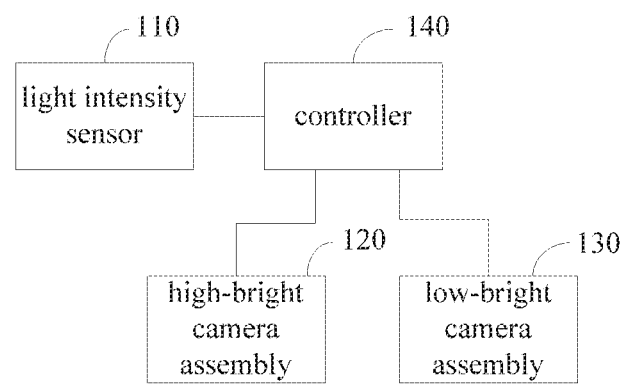
FIG. 1 is a block diagram showing a structure of a smart roadside unit according to an embodiment of the present disclosure.

Reference will be made in detail to embodiments of the present disclosure. The same or similar elements and the elements having same or similar functions are denoted by same or like reference numerals throughout the descriptions. The embodiments described herein with reference to drawings are explanatory, illustrative, and configured to generally understand the present disclosure. The embodiments shall not be construed to limit the present disclosure.

In the related art, the light sensitivity of one camera is fixed, resulting in inaccurate identification in some scenes. For example, in some scenes without street lights, there is a large difference in illumination intensity between day and night, and the light intensity for capturing images may vary greatly, which results in difficulty and error in the identification.

With the smart roadside unit according the embodiments of the present disclosure, the light intensity sensor detects the light intensity of the shooting area, it is determined by the detected light intensity to turn on the high-bright camera or the low-bright camera to acquire the high-bright image or the low-bright image, respectively, and the vehicle information is extracted from the high-bright image or the low-bright image, thus improving identification accuracy, particularly in a scene where light intensity changes greatly.

A smart roadside unit and an information processing method thereof are described below with reference to the accompanying drawings.

FIG. 1 is a block diagram showing a structure of a smart roadside unit according to an embodiment of the present disclosure.

As shown in FIG. 1, the smart roadside unit includes a light intensity sensor 110, a high-bright camera assembly 120, a low-bright camera assembly 130 and a controller 140.

Specifically, the light intensity sensor 110 is configured to generate current light intensity information, the high-bright camera assembly 120 is configured to capture a high-bright image, and the low-bright camera assembly 130 is configured to capture the low-bright image.

The controller 140 is configured to turn on the high-bright camera assembly 120 to shoot when the current light intensity is greater than a first light intensity threshold, turn on the low-bright camera assembly 130 to shoot when the current light intensity is less than a second light intensity threshold, and extract vehicle information from the high-bright image or the low-bright image, in which the second light intensity threshold is smaller than the first light intensity threshold.

In practice, in a specific scene, for example, in a scene without street lights, there is a large difference in illumination intensity between day and night, and the light intensity for capturing images may vary greatly, which results in difficulty and error in the identification.

In this embodiment, the high-bright camera assembly 120 has a lower light sensitivity than the low-bright camera assembly 130, in other words, the high-bright camera assembly 120 requires a higher light level when compared with the low-bright camera assembly 130. On this basis, the low-bright camera assembly 130 may acquire a relative clear image of an object which is located under a low bright environment or a dark environment, and the high-bright camera assembly 120 may clearly capture objects under a high bright environment.

The high-bright camera assembly 120 and the low-bright camera assembly 130 have the substantially same shooting view which refers to a substantially same shooting angle and a substantially same shooting area. In a specific embodiment, the two camera assemblies are installed at the same height in a vertical direction (i.e., a perpendicular distance from a road surface to a positon where a camera assembly is located), and a distance between the two camera assemblies in a horizontal direction is much smaller than a width of the road, such that the shooting views of the two camera assemblies are substantially same. For example, the width of the road is usually measured in meters, and the distance between the two camera assemblies is measured in millimeters, such that the shooting views of the two camera assemblies can be considered as the same.

In this embodiment, the light intensity sensor 110 detects the light intensity of the shooting area. When the detected light intensity is greater than the first light intensity threshold, i.e., the shooting area has a relative high light intensity, the controller 140 may turn on the high-bright camera assembly 120 which requires the higher light level to capture the high-bright image. When the detected light intensity is less than the second light intensity threshold, i.e., the shooting area has a relative low light intensity, the controller 140 may turn on the low-bright camera assembly 130 which has a relative high light sensitivity to shoot the area under the low bright environment to capture the low-bright image. Then, the controller 140 may extract the vehicle information of the shooting area under the high bright environment from the high-bright image and extract the vehicle information of the shooting area under the low bright environment from the low-bright image. Specifically, the vehicle information includes an amount of the vehicles, license plate number and color of each vehicle.

For example, at a road without street lights, in the daytime, light is relatively strong, the controller 140 may control the high-bright camera assembly 120 for shooting, and the light is weak at night, the controller 140 may control the low-bright camera assembly 130 for shooting. The controller 140 may extract vehicle information of the daytime road according to the high-bright image, and extract vehicle information of the evening road according to the low-bright image.

With the smart roadside unit of the embodiments of the present disclosure, the light intensity of the shooting area is detected by the light intensity sensor, and a camera assembly is selected from the high-bright camera assembly and the low-bright camera assembly according to the detected light intensity to capture the high-bright image or the low-bright image, respectively, such that vehicle information of the shooting area under environments having different light intensities may be extracted from the images captured under different environments.

In another embodiment, the controller 140 may turn on one camera assembly and turn off the other camera assembly at the same time, thus reducing power consumption and extending service life of the camera assemblies. Specifically, the controller 140 is configured to turn off the low-bright camera assembly 130 when the controller turns on the high-bright camera assembly 120 to shoot, and turn off the high-bright camera assembly 120 when the controller turns on the low-bright camera assembly 130 to shoot. Therefore, the high-bright camera assembly is turned on and the low-bright camera assembly is turned off under the high bright environment, and the high-bright camera assembly is turned off and the low-bright camera assembly is turned on under the low bright environment, thus reducing power consumption and extending service life of the cameras.

In practice, a camera may be interfered by radar signals. In order to improve the quality such as sharpness of the image, in an embodiment, the smart roadside unit may further include a first shielding layer covering at least part of the high-bright camera assembly 120 and a second shielding layer covering at least part of the low-bright camera assembly 130.

However, the shielding layer may negatively affect heat dissipation, for avoiding the negative effects, in another embodiment, the first shielding layer does not cover camera lenses and heat dissipation components of the high-bright camera assembly 120, and the second shielding layer does not cover camera lenses and heat dissipation components of the low-bright camera assembly 130. In other words, the first shielding layer covers components other than the lenses and the heat dissipation components of the high-bright camera assembly 120 and the second shielding layer covers components other than the lenses and the heat dissipation components of the low-bright camera assembly 130. Therefore, the sharpness of the image may be improved without negatively affecting the function and the heat dissipation of the camera assembly.

Figure 2:
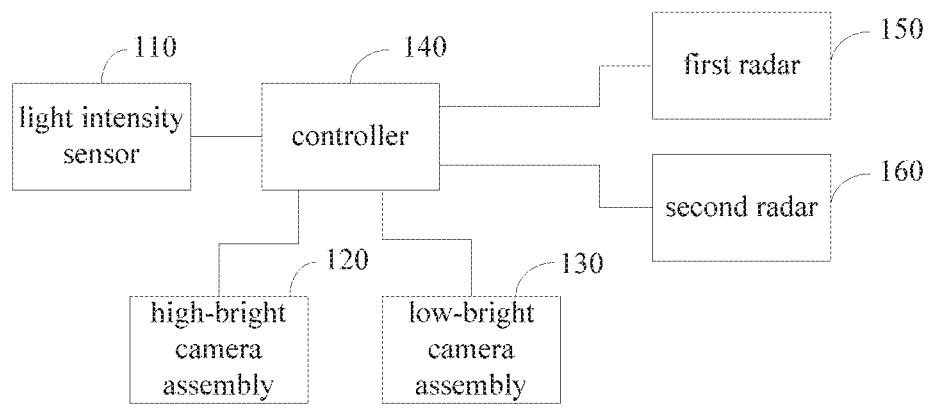
FIG. 2 is a block diagram showing a structure of a smart roadside unit according to another embodiment of the present disclosure.

FIG. 2 is a block diagram showing a structure of a smart roadside unit according to another embodiment of the present disclosure.

In order to improve the accuracy for identification, as shown in FIG. 2, besides the components shown in FIG. 1, the smart roadside unit further includes a first radar 150 and a second radar 160.

Specifically, a detection distance of the first radar 150 is greater than a detection distance of the second radar 160.

In an embodiment, the first radar 150 is disposed relatively higher than the second radar 160 in a vertical direction. In other words, a height from a road surface to a position where the first radar 150 is located is greater than a height from the road surface to a position where the second radar 160 is located. On this basis, the first radar 150 may be used to detect information of obstacles which are located in a relative long distance from the smart roadside unit, and the second radar 160 may be used to detect information of obstacles which are near the smart roadside unit. The obstacle information may include information such as a distance between an obstacle and the smart roadside unit, and an orientation of an obstacle.

In an embodiment, the first radar 150 and the second radar 160 are both laser radars having advantages of a high precision and a good anti-interference performance. In an embodiment, a detection distance of the first radar 150 is greater than a detection distance of the second radar 160. In practice, the first radar 150 may be a 64-line laser radar, and the second radar 160 may be a 16-line laser radar, and thus improving a detection accuracy of the first radar 150 and reducing cost of the second radar 160.

In another embodiment, the first radar 150 is a laser radar, and the second radar 160 is a millimeter wave radar, such that the laser radar is used to detect information of obstacles which are located in a relative long distance from the smart roadside unit, and the millimeter wave radar is used to detect information of obstacles which are near the smart roadside unit.

The controller 140 may accurately extract the vehicle information based on the high-bright image and the low-bright image and the obstacle information detected by the first radar 150 and the second radar 160.

Since the radars may accurately detect the vehicle information, such as distance, speed and orientation information, the vehicle information of the shooting area may be accurately extracted according to the vehicle information detected by the radars and the images captured by the camera assemblies.

In an embodiment of the present disclosure, the smart roadside unit may further include an antenna.

The smart roadside unit may send the obstacle information detected by the radars and the image captured by the camera assemblies to a server or an autonomous vehicle via the antenna.

The autonomous vehicle may receive the information sent by the smart roadside unit, and perform a corresponding control operation according to the received information, thus improving safety and reliability of the autonomous vehicle.

In order to prevent the antenna from interfering with the camera assembly, a distance between the antenna and the camera assembly is greater than a preset distance. In other words, a distance between the antenna and the high-bright camera assembly 120 or the low-bright camera assembly 130 is greater than the preset distance.

Figure 3:
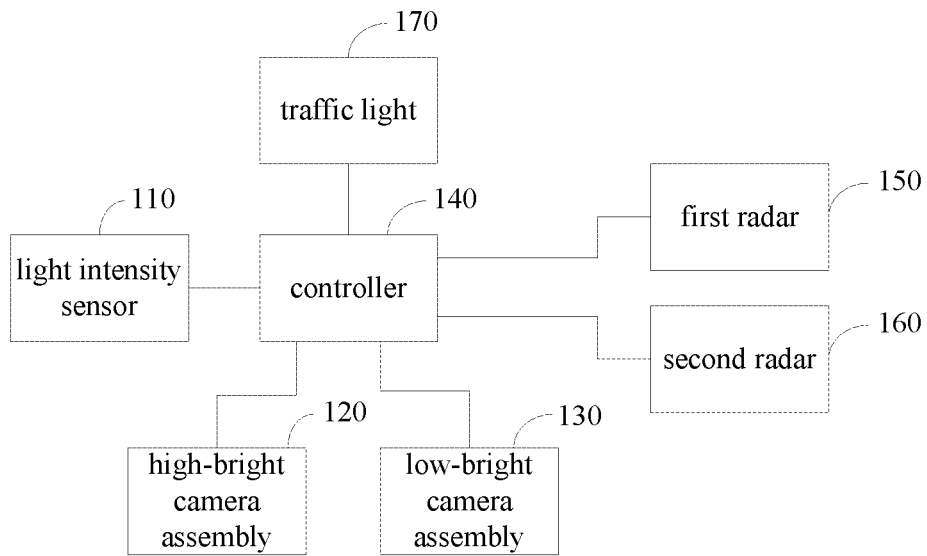
FIG. 3 is a block diagram showing a structure of a smart roadside unit according to a further embodiment of the present disclosure.

FIG. 3 is a block diagram showing a structure of a smart roadside unit according to a further embodiment of the present disclosure.

When the traffic is heavy, waiting duration of a vehicle is increased. In order to reduce the waiting duration of the vehicle, in an embodiment, as shown in FIG. 3, the smart roadside unit may further include a traffic light 170.

In this embodiment, the controller 140 may control the traffic light according to the extracted vehicle information. Specifically, the controller 140 may control the traffic light 170 according to traffic volume information. For example, if a current traffic volume is relatively large, a duration in which the light is green may be increased; if the current traffic volume is relatively small, the duration in which the light is green may be reduced.

In embodiments of the present disclosure, a method for processing information by a smart roadside unit is provided.

Figure 4:
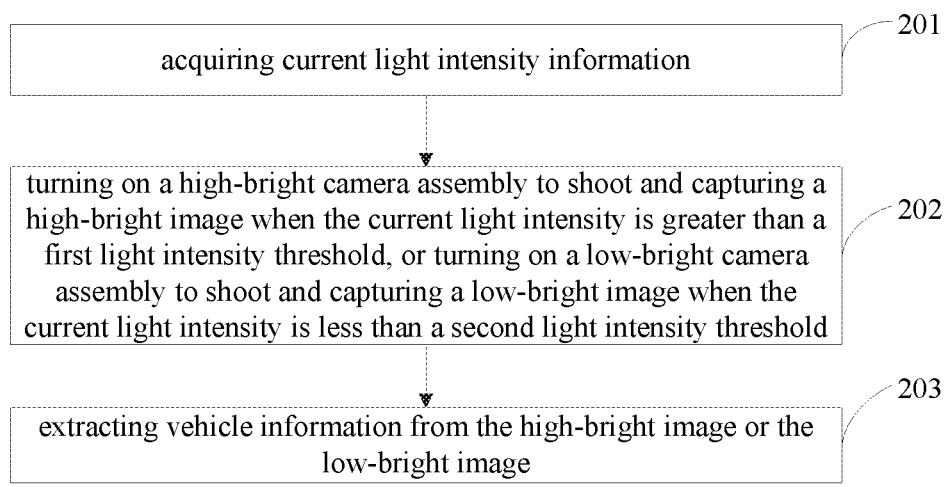
FIG. 4 is a flow chart of a method for processing information by a smart roadside unit according to an embodiment of the present disclosure.

FIG. 4 is a flow chart of a method for processing information by a smart roadside unit according to an embodiment of the present disclosure.

The method for processing information may be realized by the smart roadside unit according to embodiments of the present disclosure, so as to capture images with two camera assemblies having different light sensitivities, thus improving the accuracy for identifying vehicles.

As shown in FIG. 4, the method for processing information by a smart roadside unit is described as follows.

In block 201, current light intensity information is acquired.

In practice, in a specific scene, for example, in a scene without street lights, there is a large difference in illumination intensity between day and night, and the light intensity for capturing images may vary greatly, which results in difficulty and error in the identification.

In this embodiment, the light intensity sensor is used to detect the light intensity of the shooting area and turn on an camera assembly depending on the light intensity information.

In block 202, a high-bright camera assembly is turned on to shoot and a high-bright image is captured when the current light intensity is greater than a first light intensity threshold, or a low-bright camera assembly is turned on to shoot and a low-bright image is captured when the current light intensity is less than a second light intensity threshold.

Specifically, the second light intensity threshold is smaller than the first light intensity threshold.

In this embodiment, the high-bright image is captured by the high-bright camera assembly and the low-bright image is captured by the low-bright camera assembly.

Specifically, the high-bright camera assembly has a lower light sensitivity than the low-bright camera assembly, in other words, the high-bright camera assembly requires a higher light level when compared with the low-bright camera assembly. On this basis, the low-bright camera assembly may acquire a relative clear image of an object which is located under a low bright environment or a dark environment, and the high-bright camera assembly may clearly capture objects under a high bright environment.

On this basis, when the detected light intensity is greater than the first light intensity threshold, i.e., the shooting area has a relative high light intensity, the smart roadside unit may turn on the high-bright camera assembly which requires the higher light level to capture the high-bright image. When the detected light intensity is less than the second light intensity threshold, i.e., the shooting area has a relative low light intensity, the smart roadside unit may turn on the low-bright camera assembly which has a relative high light sensitivity to shoot the area under the low bright environment to capture the low-bright image.

In practice, the high-bright camera assembly and the low-bright camera assembly have the substantially same shooting view which refers to a substantially same shooting angle and a substantially same shooting area. In a specific embodiment, the two camera assemblies are installed at the same height in a vertical direction (i.e., a perpendicular distance from a road surface to a positon where a camera assembly is located), and a distance between the two camera assemblies in a horizontal direction is much smaller than a width of the road, such that the shooting views of the two camera assemblies are substantially same. For example, the width of the road is usually measured in meters, and the distance between the two camera assemblies is measured in millimeters, such that the shooting views of the two camera assemblies can be considered as the same.

In block 203, vehicle information is extracted from the high-bright image or the low-bright image.

The smart roadside unit may extract the vehicle information of the shooting area under the high bright environment from the high-bright image and extract the vehicle information of the shooting area under the low bright environment from the low-bright image. Specifically, the vehicle information includes an amount of the vehicles, license plate number and color of each vehicle.

For example, at a road without street lights, light is relatively strong in the daytime, the smart roadside unit may control the high-bright camera assembly for shooting, and the light is weak at night, the smart roadside unit may control the low-bright camera assembly for shooting. The smart roadside unit may extract vehicle information of the daytime road according to the high-bright image, and extract vehicle information of the evening road according to the low-bright image.

With the smart roadside unit of the embodiments of the present disclosure, the light intensity of the shooting area is detected by the light intensity sensor, and a camera assembly is selected from the high-bright camera assembly and the low-bright camera assembly according to the detected light intensity to capture the high-bright image or the low-bright image, respectively, such that vehicle information of the shooting area under environments having different light intensities may be extracted from the images captured under different environments.

In another embodiment, when one camera assembly is turned on, the other camera assembly may be turned off, thus reducing power consumption and extending service life of the camera assemblies. Specifically, the smart roadside unit is configured to turn off the low-bright camera assembly 130 when the smart roadside unit turns on the high-bright camera assembly to shoot, and turn off the high-bright camera assembly when the smart roadside unit turns on the low-bright camera assembly to shoot. Therefore, the high-bright camera assembly is turned on and the low-bright camera assembly is turned off under the high bright environment, and the high-bright camera assembly is turned off and the low-bright camera assembly is turned on under the low bright environment, thus reducing power consumption and extending service life of the cameras.

In practice, a camera may be interfered by radar signals. In order to improve the quality such as sharpness of the image, in an embodiment, the smart roadside unit may further include a first shielding layer covering at least part of the high-bright camera assembly and a second shielding layer covering at least part of the low-bright camera assembly.

However, the shielding layer may negatively affect heat dissipation, for avoiding the negative effects, in another embodiment, the first shielding layer does not cover camera lenses and heat dissipation components of the high-bright camera assembly, and the second shielding layer does not cover camera lenses and heat dissipation components of the low-bright camera assembly. In other words, the first shielding layer covers components other than the lenses and the heat dissipation components of the high-bright camera assembly and the second shielding layer covers components other than the lenses and the heat dissipation components of the low-bright camera assembly. Therefore, the sharpness of the image may be improved without negatively affecting the function and the heat dissipation of the camera assembly.

In order to improve the accuracy for identification, in an embodiment of the present disclosure, the method for processing information further includes: acquiring first obstacle information by a first radar, and acquiring second obstacle information by a second radar. Specifically, a detection distance of the first radar is greater than a detection distance of the second radar.

In an embodiment, the first radar is disposed relatively higher than the second radar in a vertical direction. On this basis, the first radar may be used to detect information of obstacles which are located in a relative long distance from the smart roadside unit, and the second radar may be used to detect information of obstacles which are near the smart roadside unit. The obstacle information may include information such as a distance between an obstacle and the smart roadside unit, and an orientation of an obstacle.

In an embodiment, the first radar and the second radar are both laser radars having advantages of a high precision and a good anti-interference performance. In an embodiment, a detection distance of the first radar is greater than a detection distance of the second radar. In practice, the first radar may be a 64-line laser radar, and the second radar may be a 16-line laser radar, and thus improving a detection accuracy of the first radar and reducing cost of the second radar.

In another embodiment, the first radar is a laser radar, and the second radar is a millimeter wave radar, such that the laser radar is used to detect information of obstacles which are located in a relative long distance from the smart roadside unit, and the millimeter wave radar is used to detect information of obstacles which are near the smart roadside unit.

The smart roadside unit may accurately extract the vehicle information based on the high-bright image and the low-bright image and the obstacle information detected by the first radar and the second radar.

Since the radars may accurately detect the vehicle information, such as distance, speed and orientation information, the vehicle information of the shooting area may be accurately extracted according to the vehicle information detected by the radars and the images captured by the camera assemblies.

In an embodiment of the present disclosure, the method for processing information by the smart roadside unit may further include: sending the obstacle information detected by the radars and the image captured by the camera assemblies to a server or an autonomous vehicle via the antenna.

The autonomous vehicle may receive the information sent by the smart roadside unit, and perform a corresponding control operation according to the received information, thus improving safety and reliability of the autonomous vehicle.

In order to prevent the antenna from interfering with the camera assembly, a distance between the antenna and the camera assembly is greater than a preset distance. In other words, a distance between the antenna and the high-bright camera assembly or the low-bright camera assembly is greater than the preset distance.

When the traffic is heavy, waiting duration of a vehicle is increased. In order to reduce the waiting duration of the vehicle, in an embodiment, the method further includes: controlling a traffic light according to extracted vehicle information.

In this embodiment, the smart roadside unit may control the traffic light according to traffic volume information. For example, if a current traffic volume is relatively large, a duration in which the light is green may be increased; if the current traffic volume is relatively small, the duration in which the light is green may be reduced.

In embodiments of the present disclosure, a smart roadside unit is provided, including: a processor; and a memory for storing programs executable by the processor; in which the processor is configured to perform a method for processing information as described in above embodiments when executing the programs.

In embodiments of the present disclosure, a non-temporary computer-readable storage medium is provided, having stored therein computer programs that, when executed by a processor, cause the processor to perform a method for processing information as described in above embodiments.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may include one or more this feature. In the description of the present disclosure, unless specified otherwise, "a plurality of" means two or more than two, for example, two or three.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A smart roadside unit, comprising:
   a light intensity sensor configured to generate current light intensity information;
   a high-bright camera assembly configured to capture a high-bright image;
   a low-bright camera assembly configured to capture a low-bright image; and
   a controller configured to
     turn on the high-bright camera assembly to shoot when the current light intensity is greater than a first light intensity threshold,
     turn on the low-bright camera assembly to shoot when the current light intensity is less than a second light intensity threshold, and
     extract vehicle information from the high-bright image or the low-bright image, wherein the second light intensity threshold is smaller than the first light intensity threshold.

2. The smart roadside unit according to claim 1, wherein the high-bright camera assembly and the low-bright camera assembly have a substantially same shooting view.

3. The smart roadside unit according to claim 1, wherein the controller is further configured to
turn off the low-bright camera assembly when the controller turns on the high-bright camera assembly to shoot, and
turn off the high-bright camera assembly when the controller turns on the low-bright camera assembly to shoot.

4. The smart roadside unit according to claim 1, further comprising:
a first shielding layer covering at least part of the high-bright camera assembly, and
a second shielding layer covering at least part of the low-bright camera assembly.

5. The smart roadside unit according to claim 4, wherein the first shielding layer does not cover camera lenses and heat dissipation components of the high-bright camera assembly; and
the second shielding layer does not cover camera lenses and heat dissipation components of the low-bright camera assembly.

6. The smart roadside unit according to claim 1, further comprising:
a first radar, and
a second radar, wherein a detection distance of the first radar is greater than a detection distance of the second radar.

7. The smart roadside unit according to claim 6, wherein the first radar is disposed relatively higher than the second radar in a vertical direction.

8. The smart roadside unit according to claim 6, wherein the first radar and the second radar are both laser radars.

9. The smart roadside unit according to claim 1, further comprising:
an antenna, wherein a distance between the antenna and the high-bright camera assembly or the low-bright camera assembly is greater than a preset distance.

10. The smart roadside unit according to claim 1, further comprising:
a traffic light controlled by the controller according to extracted vehicle information.

11. A method for processing information by a smart roadside unit, comprising:
acquiring current light intensity information;
turning on a high-bright camera assembly to shoot and capturing a high-bright image when the current light intensity is greater than a first light intensity threshold, or turning on a low-bright camera assembly to shoot and capturing a low-bright image when the current light intensity is less than a second light intensity threshold; and
extracting vehicle information from the high-bright image or the low-bright image,
wherein the second light intensity threshold is smaller than the first light intensity threshold.

12. The method according to claim 11, wherein the high-bright camera assembly and the low-bright camera assembly have a substantially same shooting view.

13. The method according to claim 11, further comprising:
turning off the low-bright camera assembly when the high-bright camera assembly is turned on to shoot, or
turning off the high-bright camera assembly when the low-bright camera assembly is turned on to shoot.

14. The method according to claim 11, wherein a first shielding layer is provided to cover at least part of the high-bright camera assembly; and
a second shielding layer is provided to cover at least part of the low-bright camera assembly.

15. The method according to claim 14, wherein the first shielding layer does not cover camera lenses and heat dissipation components of the high-bright camera assembly; and
the second shielding layer does not cover camera lenses and heat dissipation components of the low-bright camera assembly.

16. The method according to claim 11, further comprising:
acquiring first obstacle information by a first radar, and
acquiring second obstacle information by a second radar, wherein a detection distance of the first radar is greater than a detection distance of the second radar.

17. The method according to claim 16, further comprising:
sending the obstacle information and captured images to a server or a vehicle via an antenna.

18. The method according to claim 16, wherein the first radar and the second radar are both laser radars.

19. The method according to claim 11, further comprising:
controlling a traffic light according to extracted vehicle information.

20. A non-temporary computer-readable storage medium having stored therein computer programs that, when executed by a processor, cause the processor to perform a method for processing information by a smart roadside unit, the method comprising:
acquiring current light intensity information;
turning on a high-bright camera assembly to shoot and capturing a high-bright image when the current light intensity is greater than a first light intensity threshold, or turning on a low-bright camera assembly to shoot and capturing a low-bright image when the current light intensity is less than a second light intensity threshold; and
extracting vehicle information from the high-bright image or the low-bright image,
wherein the second light intensity threshold is smaller than the first light intensity threshold.

* * * * *